(12) United States Patent
    Shirako et al.

(10) Patent No.: US 9,745,166 B2
(45) Date of Patent: Aug. 29, 2017

(54) BOBBIN FOR WINDING OPTICAL FIBER AND OPTICAL FIBER

(71) Applicant: FUJIKURA LTD., Tokyo (JP)

(72) Inventors: Yukinari Shirako, Sakura (JP);
  Balasubramaniam Vasudevan, Sakura (JP); Kohei Tanaka, Sakura (JP);
  Kazunari Saito, Sakura (JP)

(73) Assignee: FUJIKURA LTD., Tokyo (JP)

( * ) Notice: Subject to any disclaimer, the term of this patent is extended or adjusted under 35 U.S.C. 154(b) by 5 days.

(21) Appl. No.: 15/049,757

(22) Filed: Feb. 22, 2016

(65) Prior Publication Data

US 2016/0167918 A1 Jun. 16, 2016

Related U.S. Application Data

(63) Continuation of application No. PCT/JP2014/072772, filed on Aug. 29, 2014.

(30) Foreign Application Priority Data

Aug. 30, 2013 (JP) ................................. 2013-179397

(51) Int. Cl.
  B65H 75/14 (2006.01)
  B65H 75/28 (2006.01)
  G02B 6/44 (2006.01)

(52) U.S. Cl.
  CPC .......... *B65H 75/146* (2013.01); *B65H 75/14* (2013.01); *B65H 75/28* (2013.01); *B65H 75/285* (2013.01); *G02B 6/4457* (2013.01); *B65H 2701/32* (2013.01)

(58) Field of Classification Search
  CPC ...... B65H 75/14; B65H 75/146; B65H 75/28; B65H 75/285; B65H 2701/32; G02B 6/4457
  See application file for complete search history.

(56) References Cited

U.S. PATENT DOCUMENTS 5,165,543 A   11/1992   Heyda et al.
6,533,216 B1   3/2003   Bumgarner et al.

FOREIGN PATENT DOCUMENTS

| CN | 1332693 A | 1/2002 |
|----|-----------|--------|
| CN | 101633453 A | 1/2010 |
| CN | 101734520 A | 6/2010 |
| CN | 202936031 U | 5/2013 |
| JP | 02-004866 U | 1/1990 |
| JP | 08-327831 A | 12/1996 |
| JP | 10-136854 A | 5/1998 |
| JP | 2806327 B2 | 9/1998 |
| JP | 2000-072329 A | 3/2000 |

(Continued)

*Primary Examiner* — William E Dondero
(74) *Attorney, Agent, or Firm* — Sughrue Mion, PLLC

(57) ABSTRACT

A bobbin for winding an optical fiber includes a main winding drum having a cylindrical shape, an auxiliary flange portion that is provided on at least one of a first end and a second end of the main winding drum in an axis direction of the main winding drum, a first main flange portion that has a larger diameter than the external diameter of the auxiliary flange portion and that is provided on the main winding drum to face the auxiliary flange portion, a second main flange portion that is provided on the main winding drum to face the first main flange portion, and an auxiliary winding drum that is provided between the first main flange portion and the auxiliary flange portion.

17 Claims, 19 Drawing Sheets

(56) References Cited

FOREIGN PATENT DOCUMENTS

| JP | 2004-091055 A | 3/2004 |
|---|---|---|
| JP | 3961991 B2 | 8/2007 |
| JP | 2010-018443 A | 1/2010 |
| WO | 0040495 A1 | 7/2000 |

BOBBIN FOR WINDING OPTICAL FIBER AND OPTICAL FIBER

CROSS REFERENCE TO RELATED APPLICATIONS

This application is a continuation application based on a PCT Patent Application No. PCT/JP2014/072772, filed Aug. 29, 2014, whose priority is claimed on Japanese Patent Application No. 2013-179397 filed Aug. 30, 2013, the entire contents of which are hereby incorporated by reference.

BACKGROUND OF THE INVENTION

Field of the Invention

The present invention relates to a bobbin for winding optical fibers, such as an optical fiber for communication. Particularly, the present invention relates to a bobbin that is suitable for allowing an optical fiber to ride over a flange portion from an auxiliary winding drum and winding the optical fiber around a main winding portion as a bobbin having the auxiliary winding drum at the end portion, and an optical fiber wound around the bobbin.

Description of the Related Art

Bobbins in which flange portions are provided at both ends of a winding drum (a main winding drum to be described below) that forms a substantially cylindrical shape are used as bobbins for winding an optical fiber. Meanwhile, it is usual to perform various kinds of measurement, such as measurement of transmission loss, and tests for quality assurance after an optical fiber for communication is wound around a bobbin. Therefore, it is necessary to expose both end portions of the lengthy optical fiber in a state where the optical fiber is wound around the bobbin, for example over a length of about several meters to about several tens of meters.

Since a winding finish end portion is located at the outermost periphery on the winding drum of the bobbin, it is natural that the optical fiber be exposed. However, a winding start end portion is located at the innermost periphery of a winding layer in which the optical fiber on the winding drum is layered and is buried in the winding layer when the optical fiber is simply wound. Thus, generally, for example as shown in FIG. 16, a bobbin 10 in which an auxiliary winding drum (also referred to as a dead winding portion) 16 is provided outside at least one main flange portion 14A (a winding start side) out of main flange portions 14A and 14B of a winding drum (main winding drum) 12 is frequently used. In the winding of the optical fiber, after the winding start end portion of the optical fiber is wound around the auxiliary winding drum 16 over about several meters to about tens of meters, the optical fiber is guided between the pair of main flange portions 14A and 14B, and the optical fiber is wound on an outer peripheral surface of the main winding drum 12 between the pair of the flange portions 14A and 14B.

In the above case, when a simple circular flange shape is given to the main flange portion 14A for starting winding without exercising particular ingenuity, the optical fiber is allowed to ride over an outer peripheral edge of the main flange portion 14A in order to guide the optical fiber from the auxiliary winding drum 16 to the main winding drum 12. Moreover, the optical fiber is guided to the outer peripheral surface of the main winding drum 12 along an inner surface of the main flange portion 14A, and winding in the main winding drum 12 is started in that state. However, in this case, the winding start end portion of the optical fiber along the inner surface of the main flange portion 14A and the optical fiber wound on the outer periphery of the main winding drum 12 cross over and overlap each other. In this way, the winding start end portion where the optical fibers cross over and overlap each other is generally referred to as a crossover wire. In a position of such a crossover wire, lateral pressure is applied to the optical fiber, and bending occurs in the optical fiber in the portion where the lateral pressure is applied. Therefore, there is a negative influence on these transmission loss properties of the optical fiber. Thus, it is desirable to guide the optical fiber from the auxiliary winding drum 16 to the main winding drum 12 so that no crossover wire is generated.

As a technique for avoiding generation of the crossover wire, as shown in FIG. 16, a hole 18 passing through the main flange portion 14A is formed at the position on the main flange portion 14A for starting winding corresponding to the vicinity of the outer peripheral surface of the main winding drum 12. The winding start end portion of the optical fiber is inserted into the hole 18 from the inner surface of the main flange portion 14A, and is pulled out to an outer surface of the main flange portion 14A, the optical fiber is reeled over a certain degree of length via the hole 18 and wound around the auxiliary winding drum 16, and then the optical fiber is wound around the main winding drum 12 (for example, Japanese Unexamined Utility Model Application, First Publication No. H2-4866 and the like). However, this technique depends on human manual work of reeling a certain length of the optical fiber and winding the optical fiber around the auxiliary winding drum 16 after an optical fiber as thin as a hair or the like is passed through the narrow hole 18. Therefore, it is very difficult to mechanize or automate work at the start of winding. Therefore, full-automation of winding work is difficult, and there are also limitations to increasing efficiency of work, and cost reduction.

Thus, as shown in FIG. 17, a slit 17 which reaches the outer peripheral surface of the main winding drum 12 in a direction toward the center from the outer peripheral edge of the main flange portion 14A is formed in the main flange portion 14A that is the winding start end portion, and guiding the optical fiber from the auxiliary winding drum 16 through the slit 17 to the main winding drum 12 is widely performed (for example, Japanese Patent Publication No. 2806327, Japanese Patent Publication No. 3961991, or the like). According to such a technique, when the optical fiber is guided from the auxiliary winding drum 16 to the main winding drum 12, since the optical fiber just needs to be dropped into the slit 17 from the outer surface of the main flange portion 14A, it is possible to automate the work.

However, since the slit 17 is formed in the main flange portion 14A, the strength and rigidity of the main flange portion 14A deteriorate greatly. Therefore, when the optical fiber is wound or delivered while rotating the bobbin at a high speed, there is a concern that the main flange portion and its root portion may be damaged. Particularly, in recent years, since an optical fiber wound around a bobbin also becomes lengthy and a force applied to the main flange portion becomes large, there has been a high possibility of the main flange portion being damaged. Additionally, if the slit as described above is provided in the main flange portion, when the bobbin around which the optical fiber is already wound is gripped by hand or the like for transfer and the like, the main flange portion may warp due to insufficient rigidity and collapse (winding collapse) of an optical fiber winding layer may occur.

In addition, although the deterioration in the strength or rigidity of the main flange portion accompanying the formation of the slit can be compensated for by reinforcing the main flange portion with ribs and the like, there are also limitations to this compensation. Therefore, it is difficult to reliably prevent damage to the above main flange portion, and the weight of the bobbin increases or costs of materials also rise.

SUMMARY OF THE INVENTION

The present invention has been made under the above circumstances, and provides a bobbin for winding an optical fiber adapted to be capable of simply and easily introducing an optical fiber, such as an optical fiber, from an auxiliary winding drum to a main winding drum, without generating a crossover wire while avoiding deterioration of the strength or rigidity of a main flange portion caused by the formation of the slit as described above, and thereby capable of mechanizing and automating winding work.

In the bobbin for winding an optical fiber related to the present invention, a shallow cutout portion is formed in an outer peripheral edge portion of the main flange portion instead of forming the slit 17 as shown in FIG. 17. A groove portion which guides an optical fiber, such as an optical fiber, from an auxiliary winding drum via a cutout portion to a main winding drum and is continuous with the cutout portion is formed in an inner peripheral surface of a flange portion, and the optical fiber is guided from the cutout portion to an outer peripheral surface of the main winding drum by the groove portion.

A first aspect of the present invention is a bobbin for winding an optical fiber including a main winding drum having a cylindrical shape; an auxiliary flange portion that is provided on at least one of a first end and a second end of the main winding drum in an axis direction of the main winding drum; a first main flange portion that has a larger diameter than an external diameter of the auxiliary flange portion and that is provided on the main winding drum to face the auxiliary flange portion; a second main flange portion that is provided on the main winding drum to face the first main flange portion; and an auxiliary winding drum that is provided between the first main flange portion and the auxiliary flange portion. A cutout portion that is recessed in a direction orthogonal to a central axis of the bobbin is formed at an outer peripheral edge of at least one of the first main flange portion and the second main flange portion. A maximum depth from the outer peripheral edge of the cutout portion is a depth that does not reach an outer peripheral surface of the main winding drum. A groove portion which communicates with the cutout portion and extends obliquely from the cutout portion along a tangential direction of the outer peripheral surface of the main winding drum toward the outer peripheral surface of the main winding drum is formed in at least an inner surface of the inner surface and an outer surface of at least one of the first main flange portion and the second main flange portion.

In a second aspect of the present invention according to the bobbin for winding an optical fiber of the first aspect described above, a bottom surface in the cutout portion, as viewed from a section orthogonal to the central axis of the bobbin, is a curved surface that is convexly curved in a radial direction of at least one of the first main flange portion and the second main flange portion and a direction away from a center, and the groove portion opens to an end portion of the cutout portion.

In a third aspect of the present invention according to the bobbin for winding an optical fiber of the second aspect described above, the curvature radius of the curve of the bottom surface of the cutout portion in the section orthogonal to the central axis of the bobbin is equal to or larger than the minimum bending radius of an optical fiber wound around the bobbin.

In a fourth aspect of the present invention according to the bobbin for winding an optical fiber of the second aspect described above, the curvature radius of the curve of the bottom surface of the cutout portion in the section orthogonal to the central axis of the bobbin is equal to or smaller than the curvature radius of a circumference, a central axis of which is a central axial line of the bobbin and which passes through the center of the bottom surface.

In a fifth aspect of the present invention according to the bobbin for winding an optical fiber of any one of the second to fourth aspects, a portion that is continuous with the end portion of the cutout portion from the groove portion is formed so as to be smoothly and continuously curved.

In a sixth aspect of the present invention according to the bobbin for winding an optical fiber of the fifth aspect, the curvature radius of the portion that is continuous with the end portion of the cutout portion from the groove portion is equal to or larger than the minimum bending radius of an optical fiber wound around the bobbin.

In a seventh aspect of the present invention according to the bobbin for winding an optical fiber of any one of the second to sixth aspects, the portion that is continuous with the end portion of the cutout portion from the groove portion is formed so that the groove width thereof is enlarged in a trumpet shape toward the end portion of the cutout portion from the groove portion.

In an eighth aspect of the present invention according to the bobbin for winding an optical fiber of any one of the first to seventh aspects, the depth of the cutout portion is determined so that the bottom surface of the cutout portion is located closer to an outer peripheral side than the maximum winding diameter position of the optical fiber to be wound around the main winding drum.

In a ninth aspect of the present invention according to the bobbin for winding an optical fiber of any one of the first to seventh aspects, the groove portions are respectively formed in both surfaces of the inner surface and the outer surface of at least one of the first main flange portion and the second main flange portion, and the groove portion on the outer surface side of at least one of the first main flange portion and the second main flange portion is formed so as to extend obliquely from the cutout portion along a tangential direction of an outer peripheral surface of the auxiliary winding drum toward the outer peripheral surface of the auxiliary winding drum.

A tenth aspect of the invention is an optical fiber wound around the bobbin for winding an optical fiber according to any one of the aspects of the first to ninth aspects in which the optical fiber is guided to the outer peripheral surface of the main winding drum via the groove portion, the cutout portion, the auxiliary winding drum, and the main winding drum, and is wound around the outer peripheral surface without a crossover wire being included.

In the bobbin for winding an optical fiber of the aspects of the present invention, as the shape of the main flange portion for allowing the optical fiber, such as an optical fiber, to ride over the main flange portion between the auxiliary winding drum and the main winding drum and to start winding of the optical fiber onto the main winding drum, a shape capable of preventing generation of a crossover wire without causing deterioration of the strength or rigidity of the main flange portion and easily allowing the optical fiber to ride over the main flange portion without depending on manual work is applied.

Therefore, according to the bobbin of the aspects of the present invention, in the work of winding the optical fiber around the bobbin, a certain length of a winding start end portion of the optical fiber is wound around the auxiliary winding drum. Thereafter, when the optical fiber is allowed to ride over the main flange portion between the auxiliary winding drum and the main winding drum and the winding in the main winding drum starts, work can be automated without generating a crossover wire. Moreover, there is also little concern that, due to there being insufficient strength or rigidity in the main flange portion, for example even in high-speed winding or a large amount of (long) winding, damage will occur in the main flange portion or its vicinity or the main flange portion will become warped and winding collapse will occur when the bobbin is gripped by hand or the like.

Additionally, according to the bobbin for winding an optical fiber of the present invention, winding work can be fully automated without the properties of the optical fiber deteriorating, and costs of work can be reduced and as a result an optical fiber product in which the optical fiber is wound around the bobbin can be manufactured at low cost.

DETAILED DESCRIPTION OF THE PREFERRED EMBODIMENTS

Hereinafter, embodiments of the present invention will be described in detail.

Figure 1:
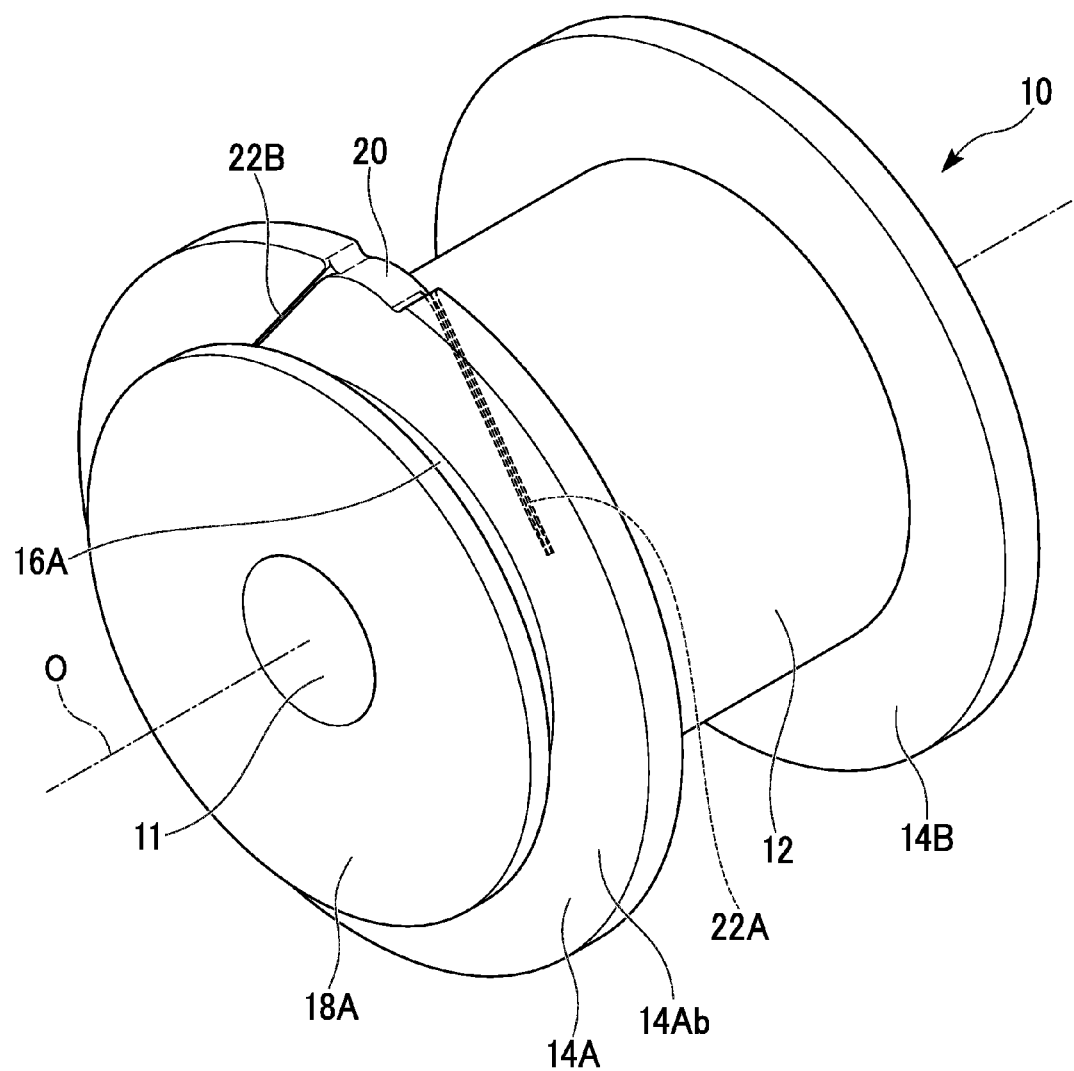
FIG. 1 is a schematic perspective view showing a bobbin for winding an optical fiber according to an embodiment of the present invention.
Figure 2:
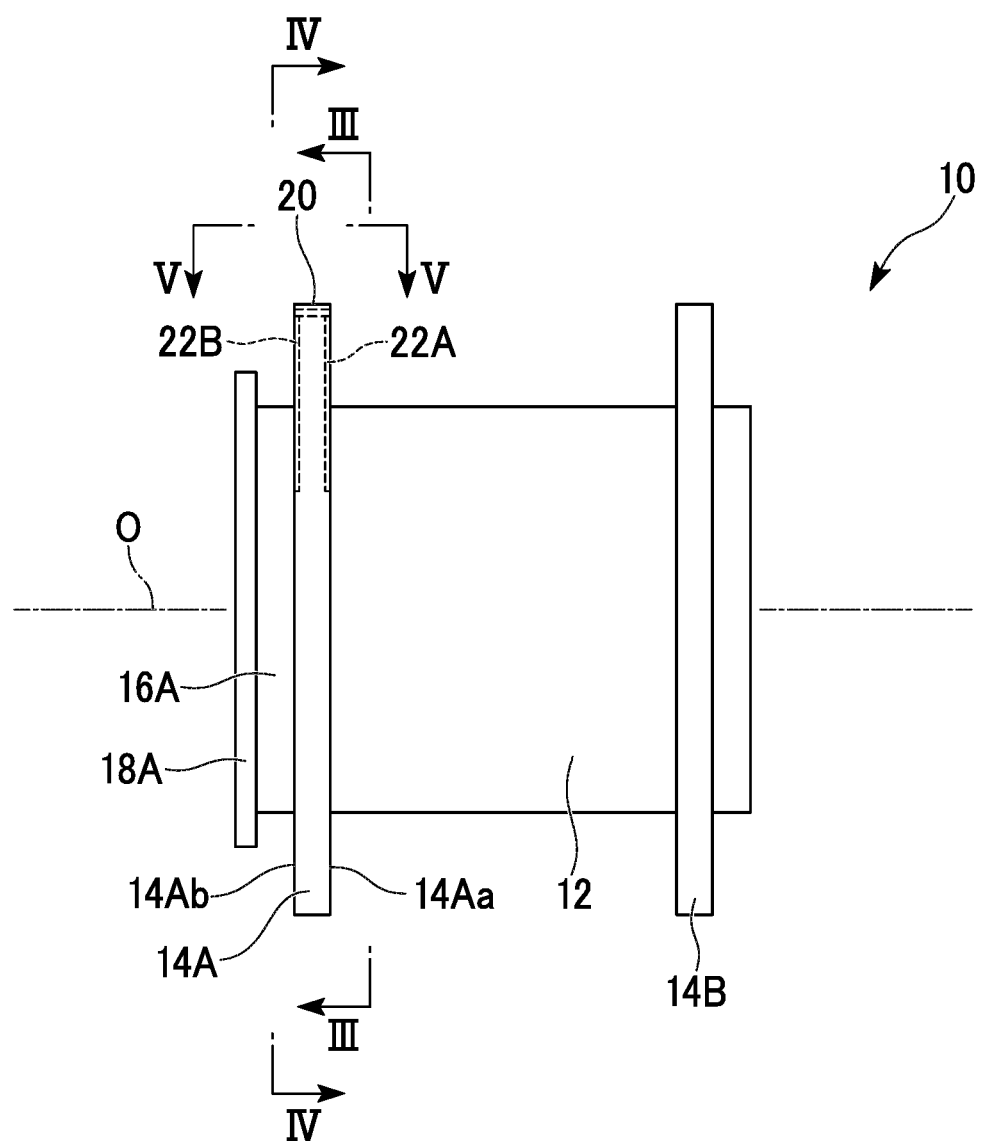
FIG. 2 is a front view of the bobbin shown in FIG. 1.
Figure 3:
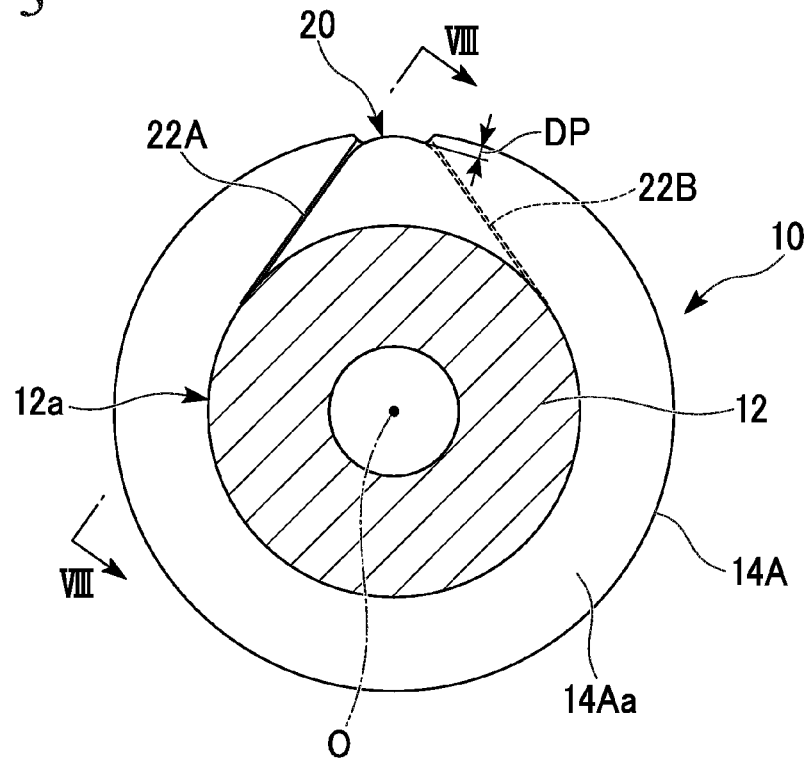
FIG. 3 is a vertical sectional right side view along line III-III of FIG. 2.
Figure 4:
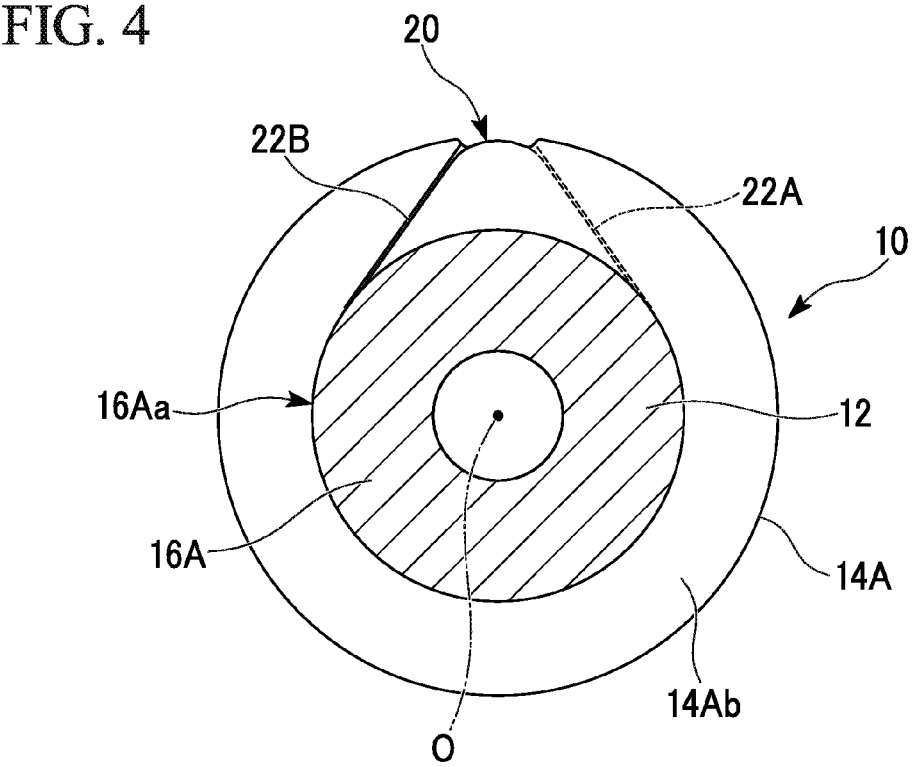
FIG. 4 is a vertical sectional left side view along line IV-IV of FIG. 2.

A bobbin for winding an optical fiber related to an embodiment of the present invention is shown in FIGS. 1 and 2, and main portions of the bobbin of the embodiment are shown in an enlarged manner in FIGS. 3 to 8. In addition, the bobbin for winding an optical fiber related to the embodiment of the present invention is mainly used in order to wind a fiber in which an optical fiber in an element wire state, that is, an optical fiber bare wire having a core and cladding is covered with a protective covering layer. In the following descriptions, an object to be wound will be described as an optical fiber. However, the bobbin of the present invention may also be used for linear objects other than the optical fiber.

In FIGS. 1 to 8, in a bobbin 10, basically, similar to a related-art bobbin, flange portions 14A and 14B with a larger diameter than the external diameter of a main winding drum 12 having a cylindrical shape are formed at both end portions of the main winding drum (main winding portion) 12 in an the axis direction. In addition, hereinafter, in order to be distinguished from an auxiliary flange portion 18A to be described below, the larger-diameter flange portions 14A and 14B on both sides of the main winding drum 12 are referred to as main flange portions. Moreover, an auxiliary winding drum 16A is formed outside the main flange portion 14A in the axis direction so as to face the main flange portion 14A, and the auxiliary flange portion 18A with a smaller diameter than the external diameter of the main flange portions 14A and 14B is provided outside the auxiliary winding drum 16A.

Additionally, the bobbin 10 is made of, for example, relatively hard resin, such as ABS resin, or metal, such as aluminum, in its entirety. Additionally, a shaft hole 11 for allowing a rotating shaft of a winder or a delivery machine to be inserted therethrough is formed in the bobbin 10 so as to pass through the inside of the bobbin 10 along a rotation center axis O.

A cutout portion 20 that is recessed toward the rotation center axis O of the bobbin 10 is formed in a portion of an outer peripheral edge of the main flange portion 14A. Groove portions 22A and 22B that communicate with the inside of the cutout portion 20 respectively are formed in an inner surface (a surface that perpendicularly rises from an outer peripheral surface 12a of the main winding drum 12)

14Aa and an outer surface (a partial surface of the auxiliary winding drum 16A) 14Ab of the main flange portion 14A so as to skew with respect to a radial direction of the main flange portion 14A along the outer peripheral surface 12a of the main winding drum 12, or a tangential direction of an outer peripheral surface 16Aa of the auxiliary winding drum 16A.

In the cutout portion 20, a bottom surface (the surface of the bobbin 10 near the central axis O) 20a is a curved surface that is convexly curved toward a radial outer side of the main flange portion 14A as viewed from a section orthogonal to the rotation center axis O of the bobbin 10.

The cutting depth (the depth toward the rotation center axis of the bobbin 10) DP (refer to FIGS. 3 and 7) of the cutout portion 20 is defined as at least a depth that does not reach the outer peripheral surface 12a of the main winding drum 12. In the case of the present embodiment, the depth is the maximum in both end portions 20b and 20c of the cutout portion 20, but is a depth where the cutout portion 20 does not reach the outer peripheral surface 12a of the main winding drum 12. In practice, it is preferable that the distance of the cutout portion 20 from the bottom surface of the cutout portion in a maximum depth place to the outer peripheral surface 12a of the main winding drum 12 be determined to be larger than the winding thickness of a maximum winding diameter in a state where the optical fiber is wound around the main winding drum 12. If the distance is set in this way, the cutout portion 20 is exposed to the outside of an optical fiber element winding layer even in the state of the maximum winding diameter.

Moreover, both the curvature radius (the curvature radius as viewed in the section orthogonal to the rotation center axis O of the bobbin 10) R1 of the convex curve of the bottom surface 20a of the cutout portion 20 and the curvature radius R2 of an inner wall surface 24Aa of a continuous portion 24A that is continuous with the groove portion 22A to be described below are beyond the minimum bending radius of the optical fiber to be wound around the bobbin 10.

In addition, here, the minimum bending radius of the optical fiber is also referred to as an allowable bending radius, and is defined as a bending radius such that bending loss falls within a guaranteed value. Although the minimum bending radius varies depending on the type, structure, diameter, and the like of optical fibers, it is general in element wires of general-purpose single mode fibers for communication that the minimum bending radius be about 30 mm in many cases or be also about 15 mm these days. Although the curvature radii R1 and R2 of the convex curve of the bottom surface 20a of the cutout portion 20 need to be equal to or larger than the above minimum bending diameter, it is desirable to make the optical fiber as small as possible even at the minimum bending diameter or more in order to wind the optical fiber as much as possible after taking the above matter into consideration.

In addition, although it is desirable that the curvature radius R1 of the convex curve of the bottom surface 20a of the cutout portion 20 be constant, it is also posssible for the curvature to vary continuously and smoothly after the above standard is satisfied.

One end portion (one end portion as viewed in the circumferential direction of the bobbin 10) 20b of the cutout portion 20 is continuous with the groove portion 22A formed in the inner surface 14Aa of the main flange portion 14A. The groove width of a portion 24A in which the groove portion 22A is continuous with one end portion 20b of the cutout portion 20 is enlarged in a so-called trumpet shape toward the end portion 20b of the cutout portion 20, and the continuous portion 24A is smoothly and continuously curved.

Additionally, the other end portion (the other end portion as viewed in the circumferential direction of the bobbin 10) 20c of the cutout portion 20 similarly is continuous with the groove portion 22B formed in the outer surface 14Ab of the main flange portion 14A. The groove width of a portion 24B in which the groove portion 22B is continuous with the other end portion 20c of the cutout portion 20 is also enlarged in a so-called trumpet shape, and the continuous portion 24B is smoothly and continuously curved.

Here, the details about the above "the groove width is enlarged in a trumpet shape" and "is smoothly and continuously curved" will be further described in detail below.

More specifically, the groove portion 22A just needs to have a width and a depth such that the optical fiber to be wound can be housed along the length direction of the optical fiber. Accordingly, the width and the depth just need to be larger than the external diameter of the optical fiber to be wound. In the present embodiment, the section of the groove portion 22A in the length direction (the direction parallel to the outer surface 14Ab of the main flange portion 14A) has a rectangular shape (U-shape). The groove portion 22A is formed by two facing inner wall surfaces 22Aa and 22Ab extending along a depth direction of the groove portion 22A (perpendicular to the inner surface 14Aa of the main flange portion 14A), and a groove bottom surface 22Ac (refer to FIG. 6). A bottom surface of one end portion 20b of the cutout portion 20 is smoothly continuous with the inner wall surface 22Aa near the central axis O of the bobbin out of the two inner wall surfaces 22Aa and 22Ab extending along the depth direction of the groove portion 22A in the groove portion 22A.

In the aforementioned continuous portion 24A, the inner wall surface 22Aa is formed so as to be smoothly and convexly curved smoothly. The curvature radius R2 (refer to FIG. 6) of the convex curve of the inner wall surface 24Aa is also equal to or larger than the minimum bending radius of the optical fiber to be wound. Here, it is desirable that the above inner wall surface 22Aa be a contact surface between the bottom surface 20a of the cutout portion 22 and the outer peripheral surface 12a of the main winding drum.

Moreover, in the continuous portion 24A of the contact surface, the depth D (refer to FIGS. 5 and 8) of the inner wall surface 22Aa of the groove portion 22A in the groove depth direction is enlarged in a trumpet shape toward the end portion 20b of the cutout portion 20. Additionally, the width W (refer to FIG. 6) between the two inner wall surfaces 22Aa and 22Ab of the groove portion 22A is enlarged toward the end portion 20b of the cutout portion 20.

Additionally, in the end portion of the groove portion 22A on the outer peripheral surface side of the main winding drum, it is desirable for a bottom surface 22c of the groove portion 22A to be smoothly curved on the convex curve. Additionally, it is desirable that the curvature radius R3 (refer to FIG. 8) be equal to or larger than the minimum bending radius of the optical fiber to be wound.

The other end portion (the other end portion as viewed in the circumferential direction of the bobbin 10) 20c of the cutout portion 20 is continuous with the groove portion 22B formed in the outer surface 14Ab of the main flange portion 14A. The portion 24B in which the groove portion 22B is continuous with the other end portion 20c of the cutout portion 20 also has a so-called trumpet shape, and the continuous portion 24B is smoothly and continuously curved. Here, the detailed shape of the portion 24B in which the groove portion 22B of the outer surface 14Ab of the main flange portion 14A is continuous with the other end portion 20c of the cutout portion 20 just needs to be the same as the shape of the portion 24A in which the groove portion 22A formed in the inner surface 14Aa of the aforementioned main flange portion 14A is continuous with the one end portion 20b of the cutout portion 20. Then, the detailed description about the continuous portion 24B is omitted. Additionally, although it is not necessary to strictly set the end portion, on the outer peripheral surface 16Aa side of the auxiliary winding drum 16, of the groove portion 22B formed in the outer surface 14Ab of the main flange portion 14A as in the configuration of the groove portion 22A on the inner surface 14Aa side, it is desirable to determine the end portion of the groove portion 22B similarly to the end portion of the groove portion 22A on the inner surface 14Aa side in practice.

Figure 5:
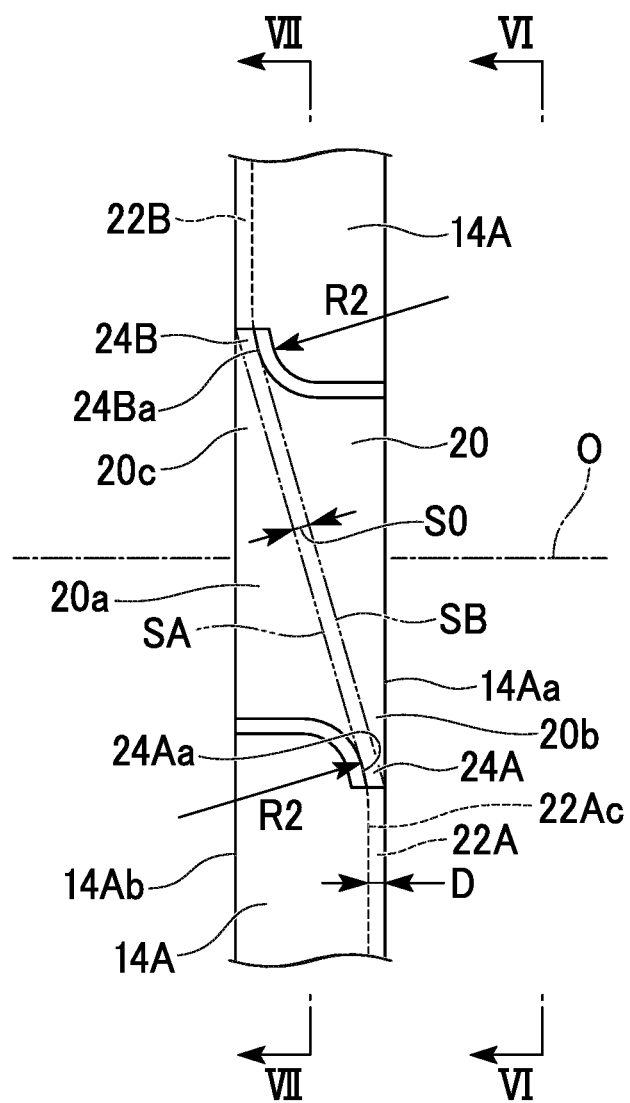
FIG. 5 is an enlarged plan view of a portion shown by arrowed line V-V in FIG. 2.
Figure 6:
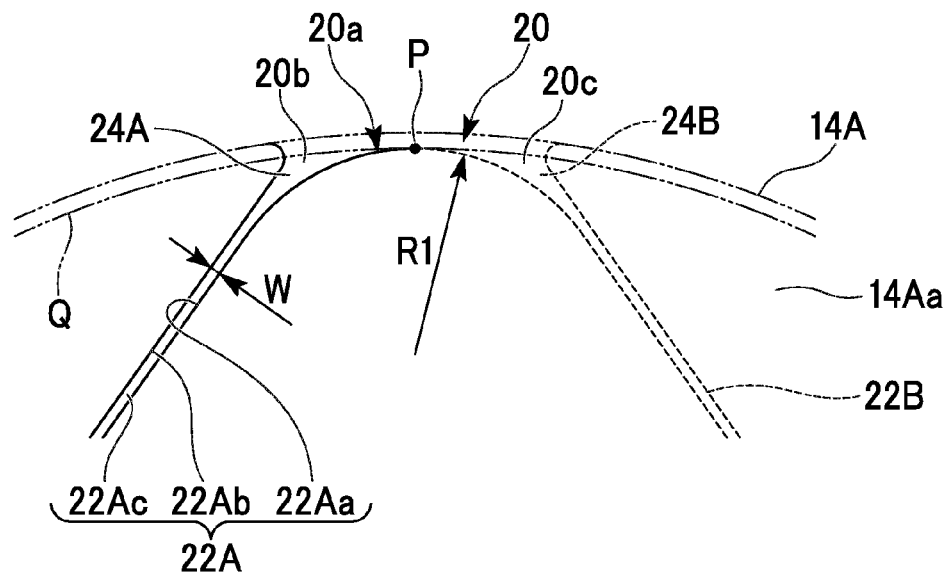
FIG. 6 is a right side view along line VI-VI of FIG. 5.
Figure 7:
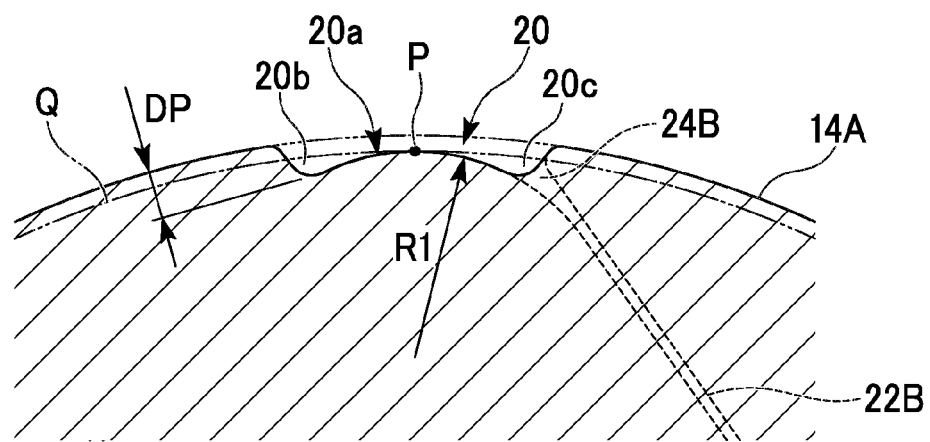
FIG. 7 is a vertical sectional right side view along line VII-VII of FIG. 5.
Figure 8:
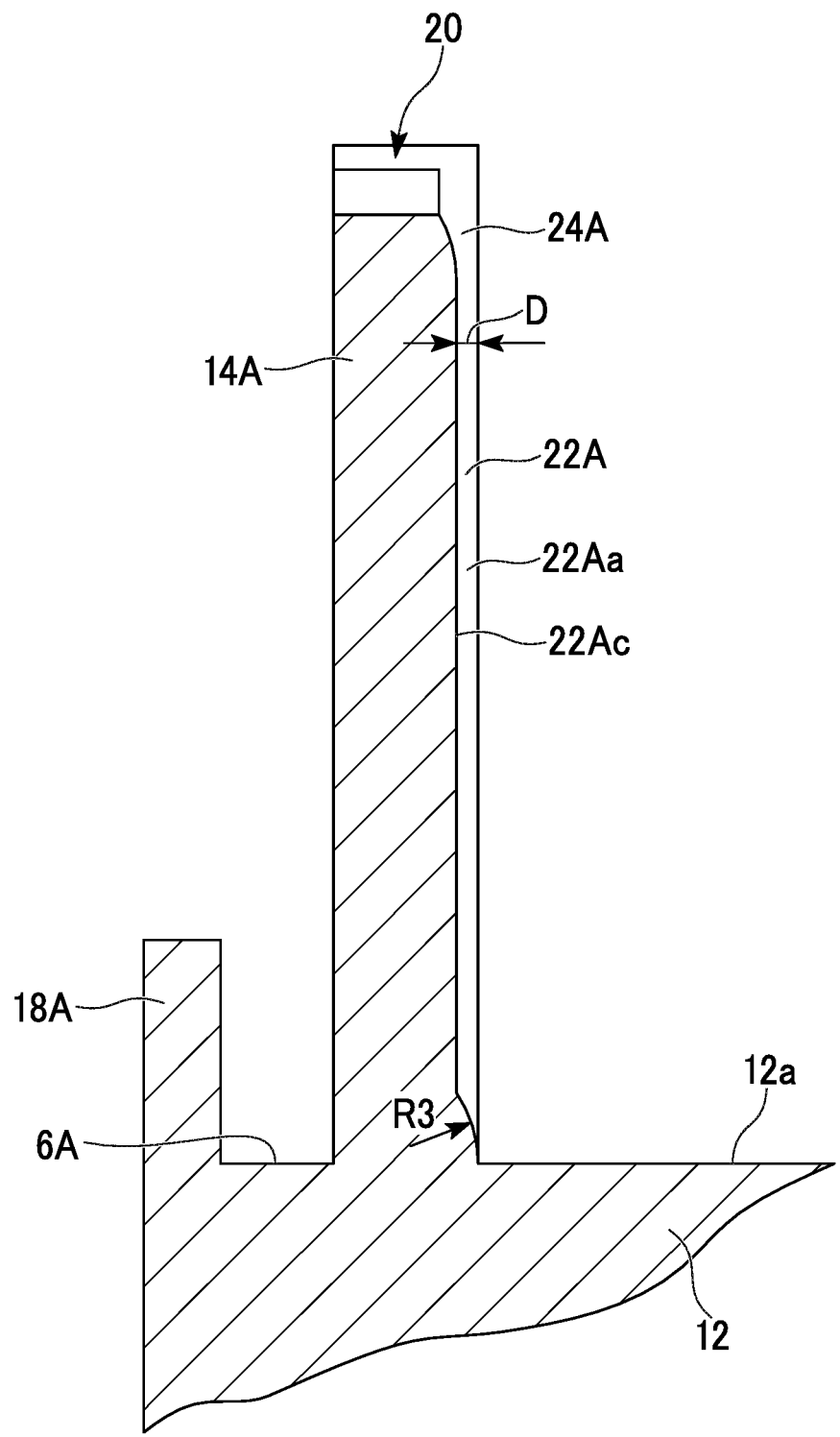
FIG. 8 is an enlarged vertical sectional view along line VIII-VIII of FIG. 3.

Moreover, it is desirable that the positional relationship between an opening end portion (continuous portion 24A) of the groove portion 22A which opens to the cutout portion 20 on the inner surface 14Aa side of the main flange portion 14A and an opening end portion (continuous portion 24B) of the groove portion 22B which opens to the cutout portion 20 on the outer surface 14Ab side of the main flange portion 14A satisfy the relationship as shown by chain lines SA and SB of FIG. 5. That is, it is desirable to set the positional relationship so that a larger space S0 than the external diameter of the optical fiber to be wound is secured between a tangential line extension line SA of the inner wall surface 24Aa of the continuous portion 24A and a tangential line extension line SB of the inner wall surface 24Ba of the continuous portion 24B.

Figure 10A:
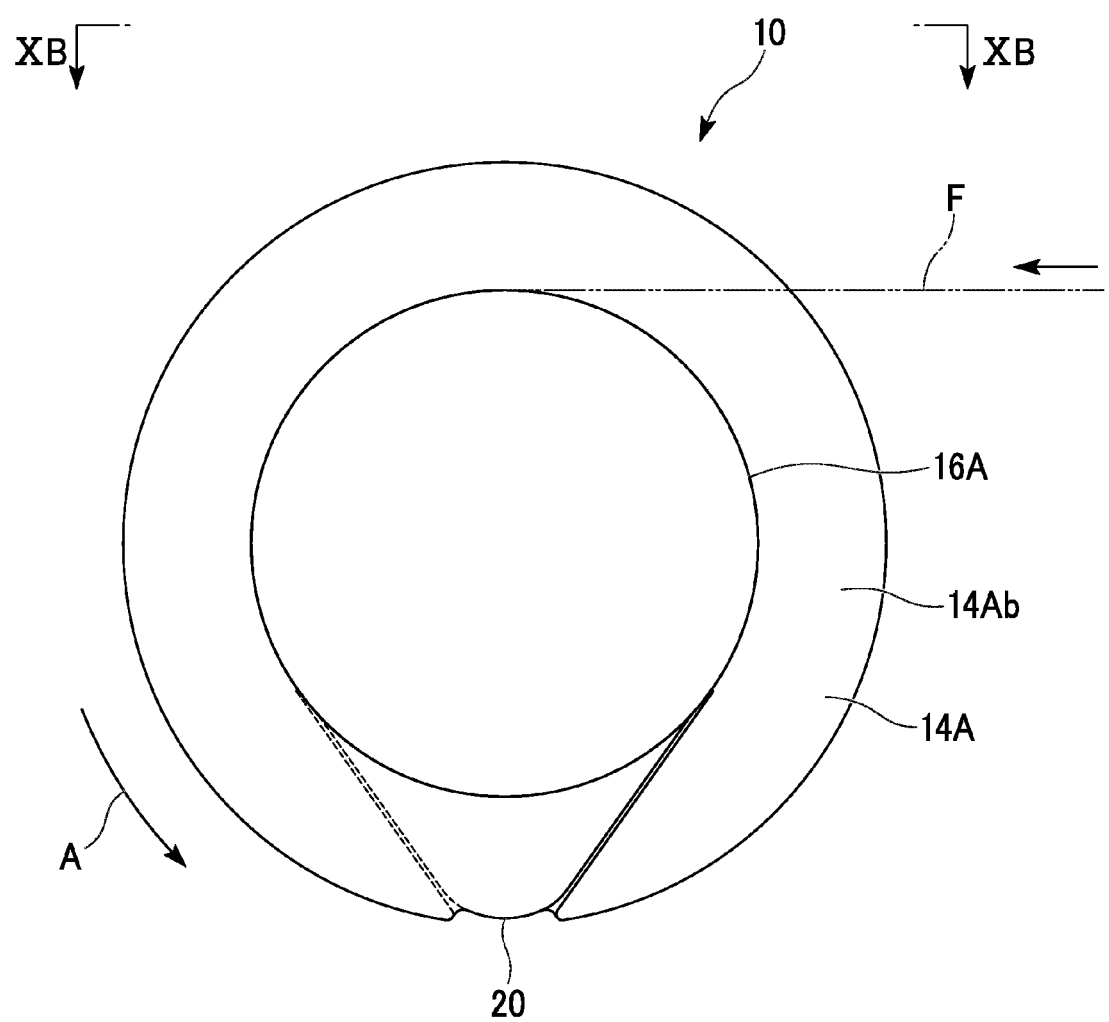
FIG. 10A is a schematic view from a left side surface side showing an initial step for transferring the optical fiber to a main winding drum, subsequently to the step shown in FIG. 9.
Figure 10B:
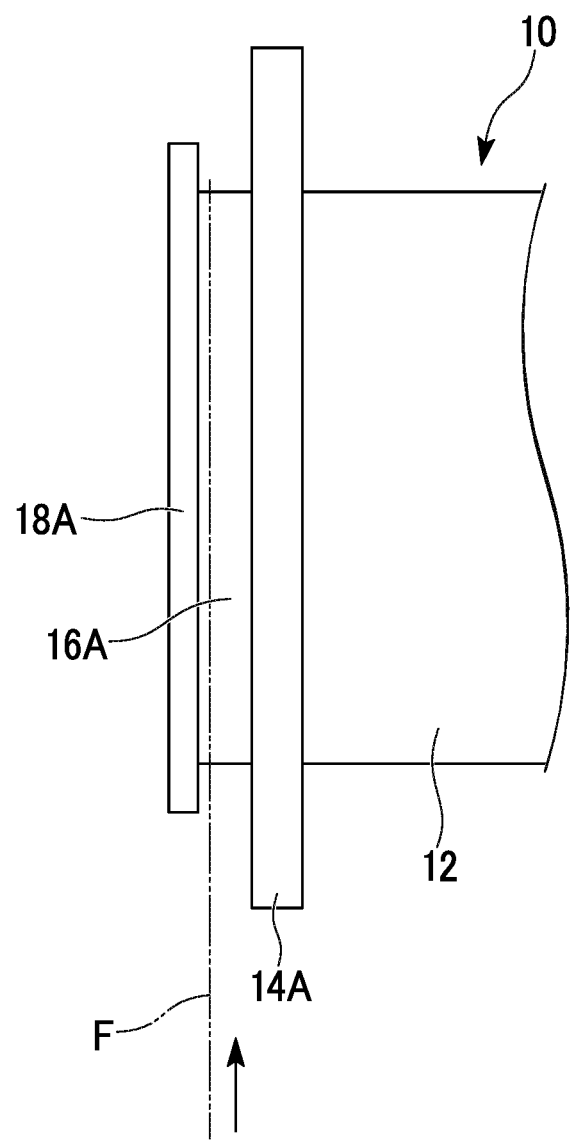
FIG. 10B is a plan view as viewed from arrowed line XB-XB in FIG. 10A.
Figure 11A:
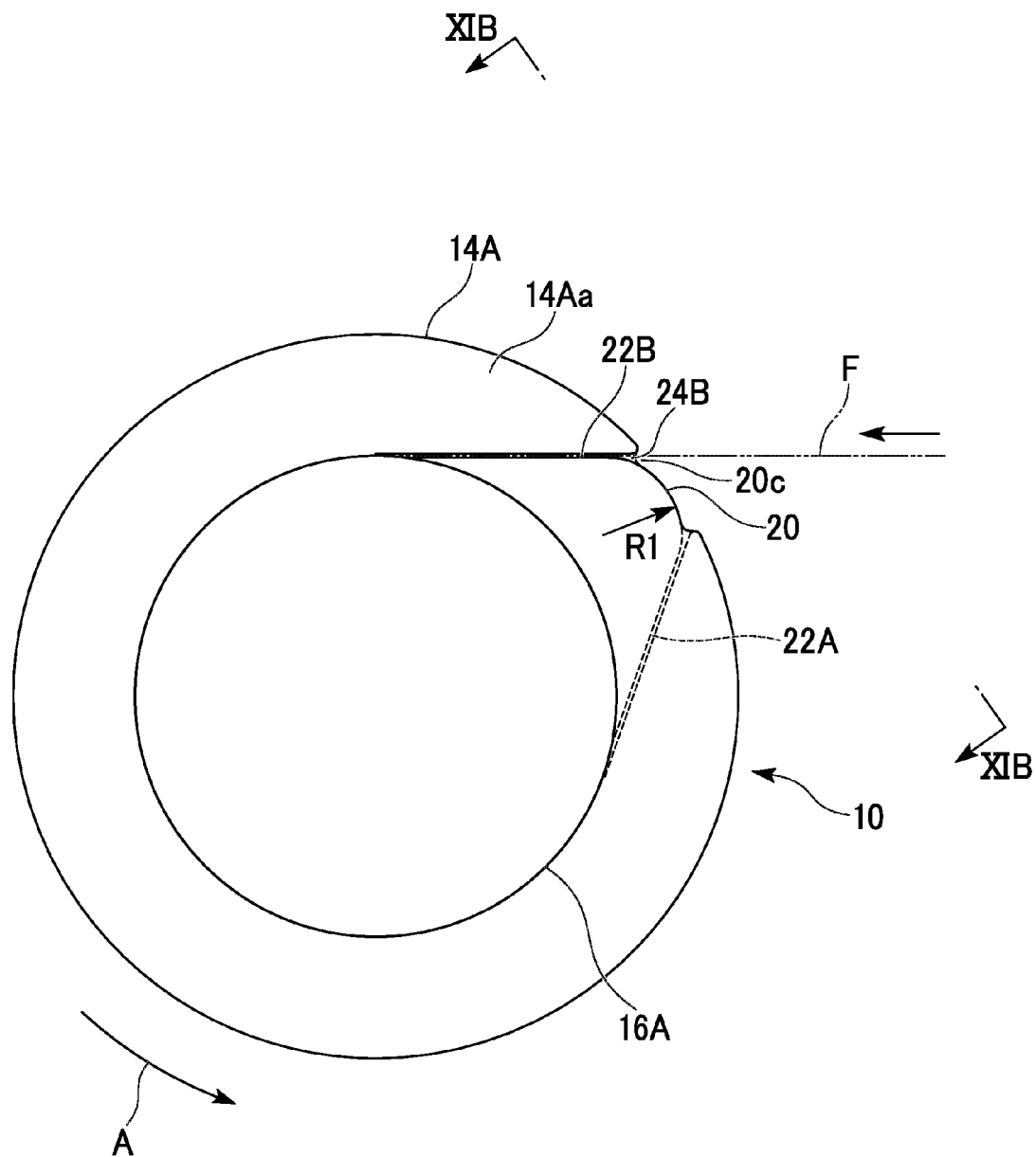
FIG. 11A is a schematic view from the left side surface side showing the circumstances of a second step for transferring the optical fiber to the main winding drum, subsequently to the step shown in FIGS. 10A and 10B.
Figure 11B:
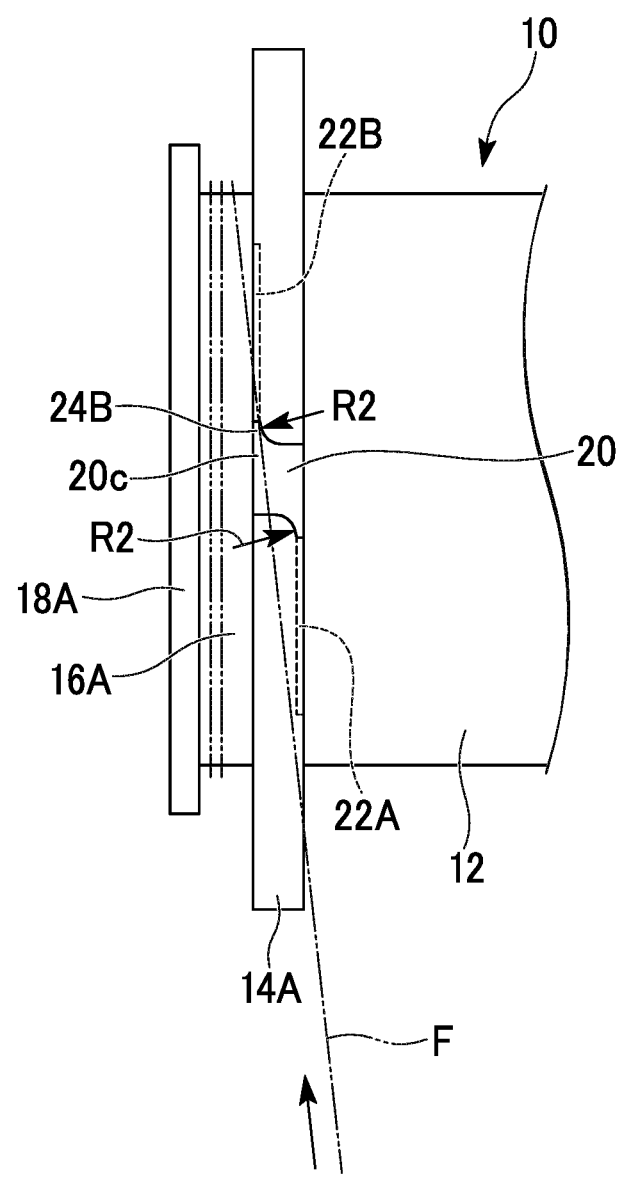
FIG. 11B is a plan view as viewed from arrowed line XIB-XIB in FIG. 11A.
Figure 12A:
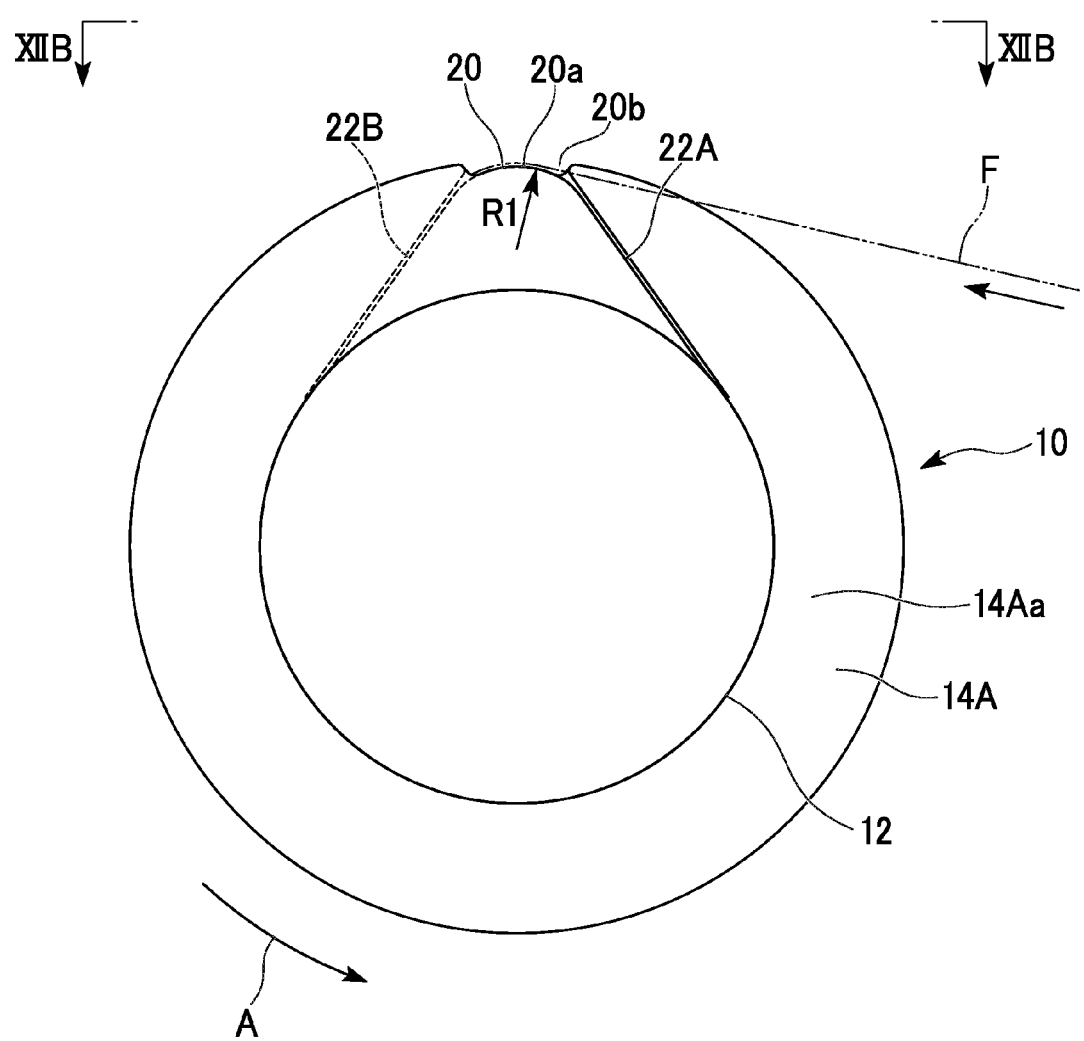
FIG. 12A is a schematic view from a right side surface side showing the circumstances of a third step for transferring the optical fiber to the main winding drum, subsequently to the step shown in FIGS. 11A and 11B.

The circumstances in which the optical fiber is wound around the bobbin 10 of the embodiment as above will be stepwisely described below, referring to FIGS. 9 to 13C. In addition, FIGS. 10A and 11A are schematic views of a section in a case where the bobbin 10 is viewed from a left surface side, and FIGS. 12A and 13A are schematic views of a section in a case where the bobbin 10 is viewed from a right surface side.

Figure 9:
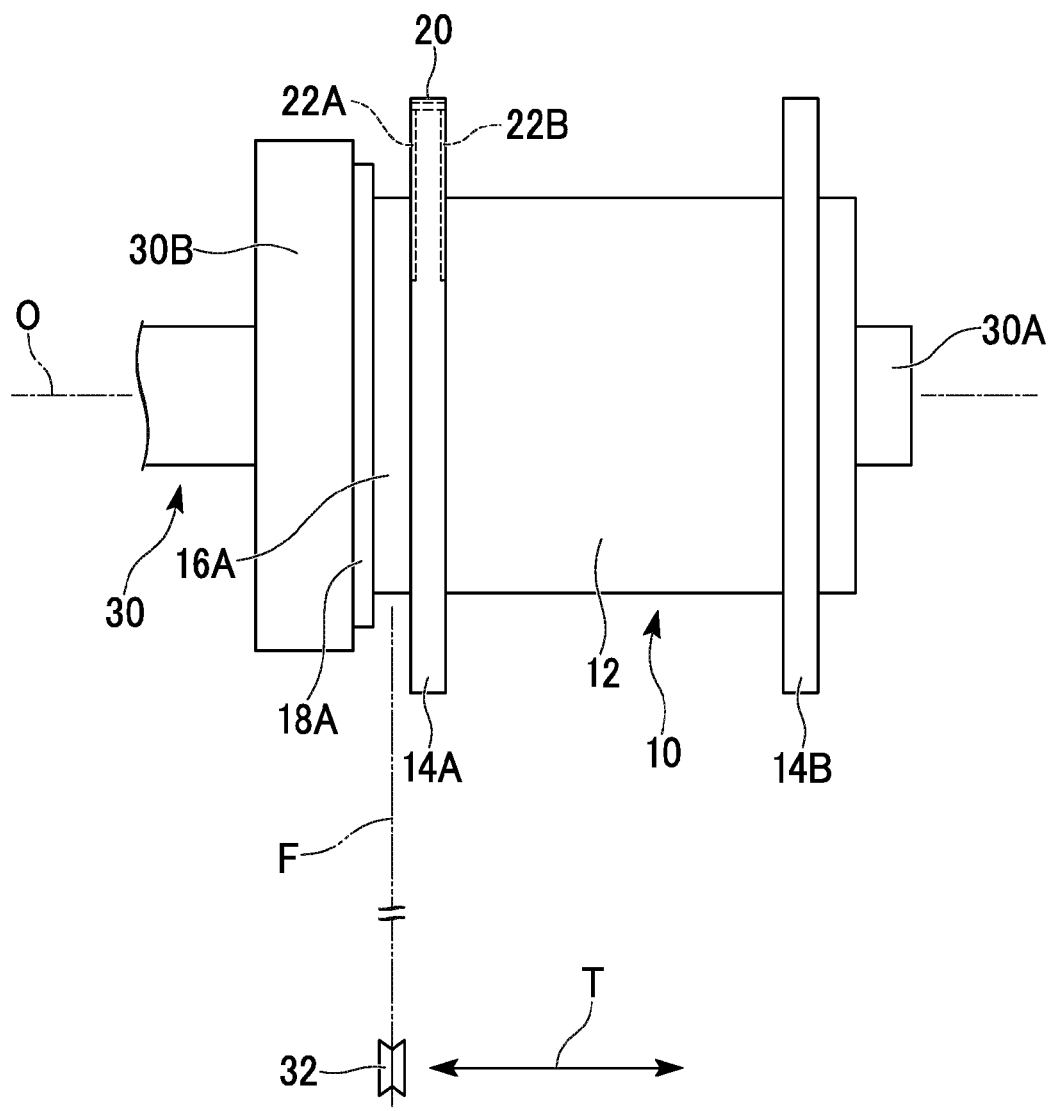
FIG. 9 is a schematic front view showing the circumstances of a step of winding an optical fiber around an initial auxiliary winding drum when winding the optical fiber using the bobbin shown in FIGS. 1 to 8.

As shown in FIG. 9, the bobbin 10 is mounted on a winder 30. That is, the bobbin 10 is attached to a rotating shaft 30A so that the rotating shaft 30A of the winder 30 is inserted through a shaft hole 11 of the bobbin 10 and the bobbin 10 rotates around an axial center with the rotation of the rotating shaft 30A. In addition, here, one main flange portion 14A in the main winding drum 12 of the bobbin 10 is referred to as a winding start portion. Additionally, as for the optical fiber F supplied to the bobbin 10, the supply position thereof to the bobbin 10 may be continuously moved (traverse T) parallel to the axis direction of the bobbin 10 by a supply position-restricting member 32, such as a traverser or a guide roller. However, depending on the case, the supply position of the optical fiber F may be fixed, and the bobbin 20 may be moved (traversed) along the rotation center axis.

At the start of winding, a winding start end portion of the optical fiber F to be wound is appropriately fixed to the vicinity of the auxiliary winding drum 16A or the auxiliary flange portion 18A (for example, an end portion of the optical fiber is pinched and sandwiched between a flange board 30B of the winder 30 and the bobbin 10). As shown in FIGS. 10A and 10B, the bobbin 10 is rotated in the direction of arrow A while continuously supplying the optical fiber F, and the winding start portion of the optical fiber F is wound around the auxiliary winding drum 16A over about several meters to about several tens of meters.

Subsequently, with the end of winding to the auxiliary winding drum 16A, the optical fiber F is allowed to ride over the main flange portion 14A and is wound around the main winding drum 12. In that case, as shown in FIGS. 11A and 11B, while the rotation of the bobbin 10 to the direction of arrow A is made to continue slowly, the position of the optical fiber F supplied toward the bobbin 10 is traversed (or in contrast to this, the bobbin 10 is traversed) parallel to the axis direction of the bobbin 10 and in an orientation from the auxiliary winding drum 16A toward the main winding drum 12.

Accordingly, the optical fiber F comes into contact with the outer peripheral edge of the main flange portion 14A. If the optical fiber F reaches the position of the cutout portion 20 formed in the outer peripheral edge of the main flange portion 14A, the optical fiber F falls into the end portion 20c of the cutout portion 20. In this case, if the groove portion 22B is formed in the outer surface 14Aa of the main flange portion 14A as shown in the present embodiment, at least a portion of the optical fiber enters the groove portion 22B, and the optical fiber F easily falls into and enters (is easily guided) the end portion 20c of the cutout portion 20. In this state, the optical fiber F passes via the continuous portion 24B from the groove portion 22B to the end portion 20c of the cutout portion 20.

Figure 12B:
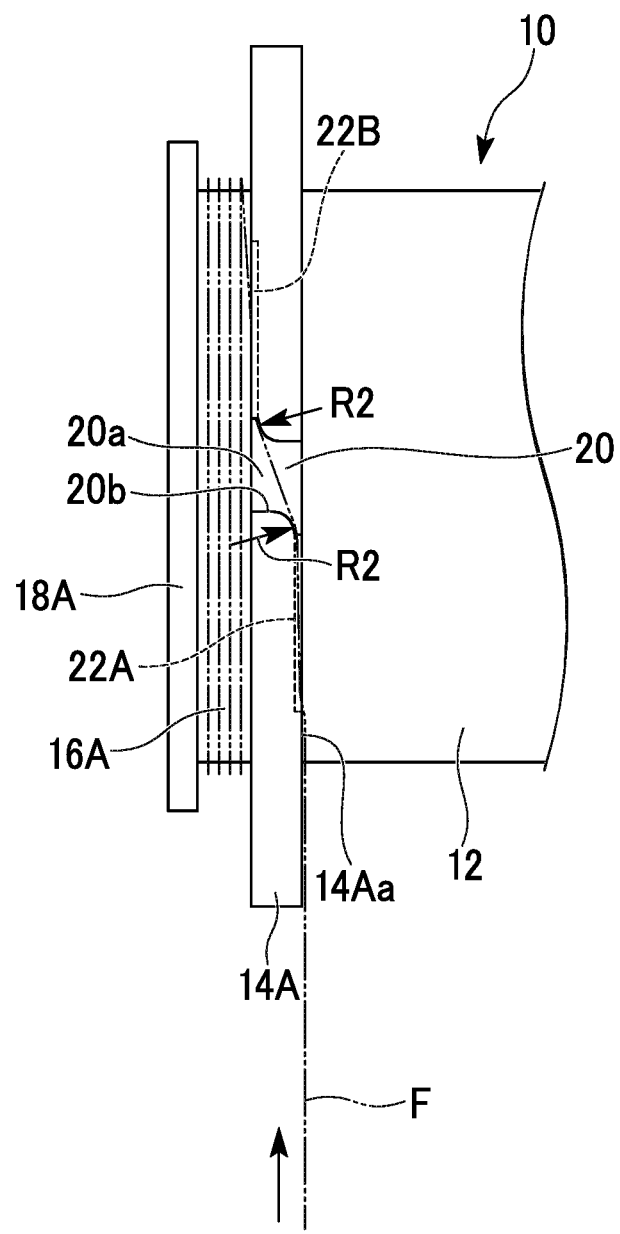
FIG. 12B is a plan view as viewed from arrowed line XIIB-XIIB in FIG. 12A.
Figure 13A:
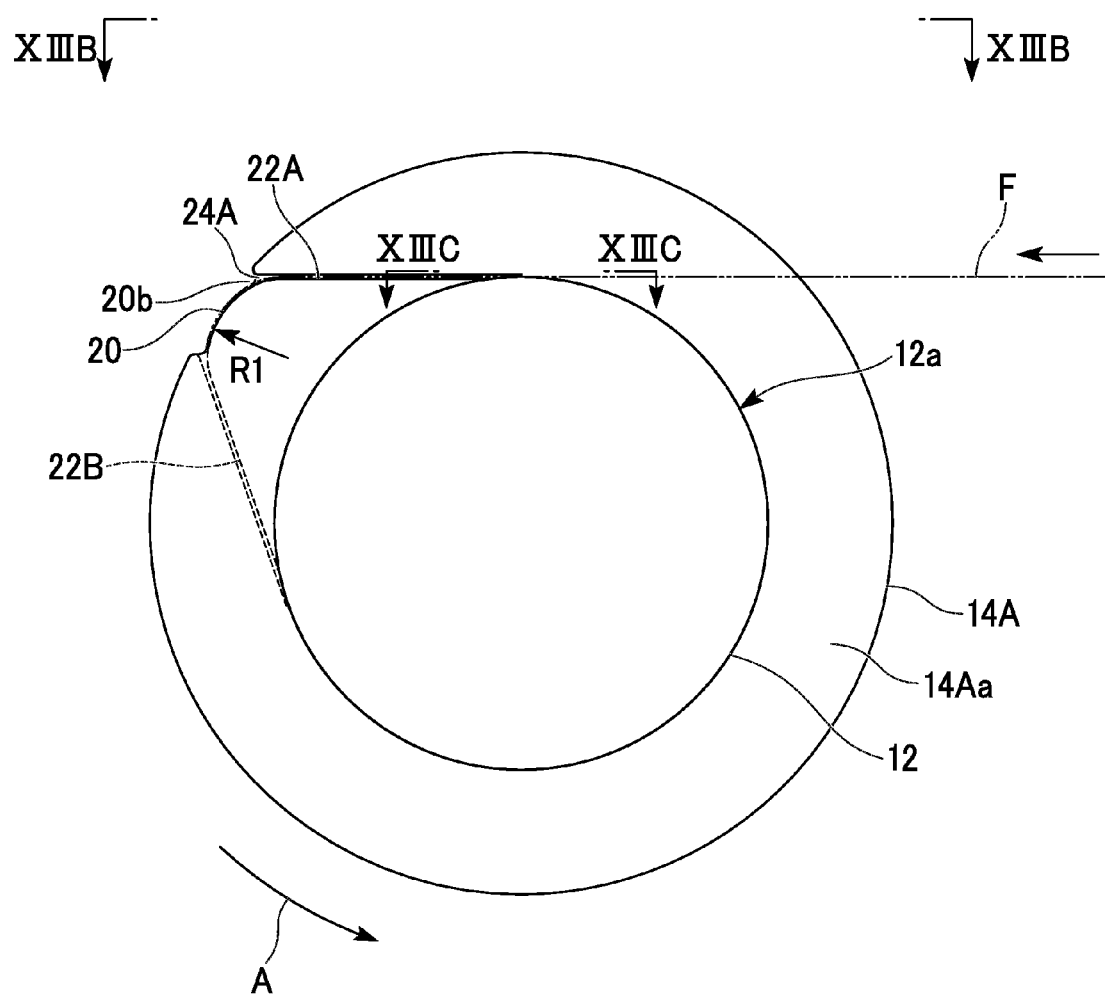
FIG. 13A is a schematic view from the right side surface side showing the circumstances of a fourth step for transferring the optical fiber to the main winding drum, subsequently to the step shown in FIGS. 12A and 12B.

Moreover, if the rotation of the bobbin 10 is made to continue slowly, as shown in FIGS. 12A and 12B, the optical fiber F enters the cutout portion 20 over the entire length of the cutout portion 20 in the length direction. Then, the optical fiber F is caught in the end portion 20b of the cutout portion 20, and comes into contact with the bottom surface 20a of the cutout portion 20.

Figure 13B:
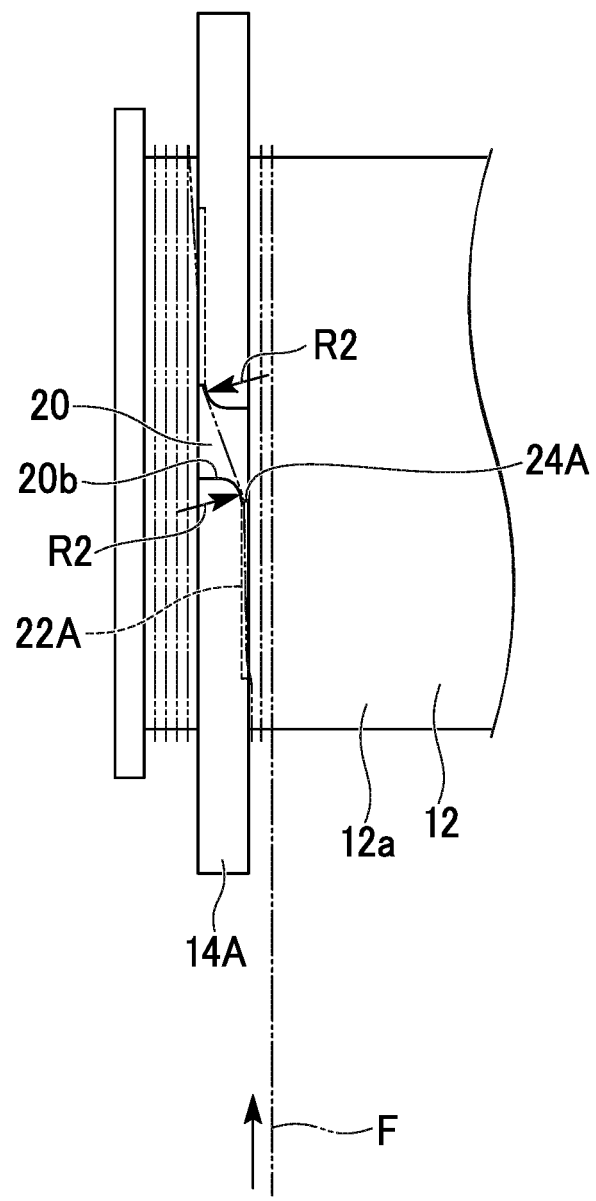
FIG. 13B is a plan view as viewed from arrowed line XIIIB-XIIIB in FIG. 13A.
Figure 13C:
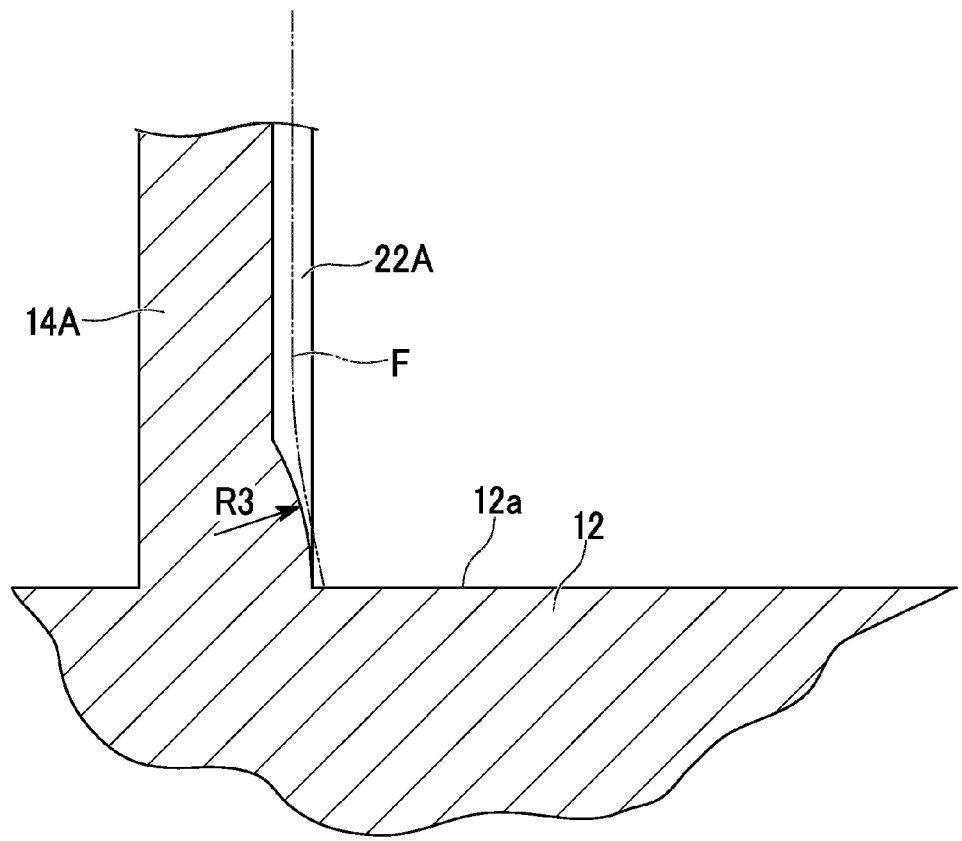
FIG. 13C is an enlarged sectional view along line XIIIC-XIIIC in FIG. 13A.

Subsequently, with the rotation of the bobbin 10, as shown in FIGS. 13A to 13C, the optical fiber F enters the groove portion 22A formed in the inner surface 14a of the main flange portion 14A via the continuous portion 24A from the end portion 20b of the cutout portion 20. That is, the optical fiber F is guided toward the outer peripheral surface 12a of the main winding drum 12 through the inside of the groove portion 22A from the inside of the cutout portion 20.

Moreover, the optical fiber F is wound round the main winding drum 12 with the rotation of the bobbin 10. That is, as shown in FIG. 13C, the optical fiber F is inclinedly guided toward the outer peripheral surface 12a of the main winding drum from the end portion of the groove portion 22A on the outer peripheral surface 12a side of the main winding drum, and is further wound around the outer peripheral surface 12a of the main winding drum.

In this way, a process from a step of winding the optical fiber around the auxiliary winding drum 16A to a step of winding the optical fiber around the main winding drum 12 over the main flange portion 14A can be simply and easily performed by guiding using the groove portion 22B, the continuous portion 22A, the cutout portion 20, the continuous portion 24A, and the groove portion 22A only through the movement (traverse) of the supply position of the optical fiber or the bobbin and the rotation of the bobbin 10. Therefore, it is possible to easily automate the above process.

Here, when the optical fiber F is wound around the main winding drum 12, a lot of optical fiber F is layered on the outer periphery of the main winding drum 12. As described above, in the winding start step to the main winding drum 12, the optical fiber F guided from the outer peripheral side of the main flange portion 14A via the cutout portion 20 to the outer peripheral surface of the main winding drum 12 is housed within the groove portion 22A. Therefore, the optical fiber F does not substantially protrude from the inner surface 14Aa of the main flange portion 14A. Therefore, the optical fiber F wound around the outer peripheral surface of the main winding drum 12 in a laminated manner is substantially prevented from overlapping with and being bent by the optical fiber guided to the outer peripheral surface of the main winding drum 12 from the outer peripheral side of the main flange portion 14A, and lateral pressure is applied to the optical fiber F. That is, a crossover wire as already described is not substantially generated. Therefore, a negative influence (mainly an increase in transmission loss) on the optical fiber caused by bending resulting from the crossover wire or the lateral pressure can be prevented.

Additionally, when the optical fiber is guided from the groove portion 22B of the outer surface 14Ab of the main flange portion 14A via the continuous portion 24B to the cutout portion 20, the inner wall surface 24Ba of the continuous portion 24B is smoothly curved with the curvature radius R2 equal to or larger than the minimum bending radius of the optical fiber. Therefore, when the optical fiber F is introduced into the cutout portion 20 from the groove portion 22B, the optical fiber is prevented from being bent with a bending radius smaller than the minimum bending radius.

Additionally, even when the optical fiber F is pushed against the bottom surface 20a of the cutout portion 20 within the cutout portion 20, the cutout portion 20 and the bottom surface 20a of the portion 24A or 24B continuous with the cutout portion 20 are smoothly curved with the curvature radius R1 equal to or larger than the minimum bending radius of the optical fiber. Therefore, the optical fiber is prevented from being bent with a bending radius smaller than the minimum bending radius.

Additionally, even when the optical fiber is guided from the groove portion 22B of the outer surface 14Ab of the main flange portion 14A via the continuous portion 24B and further from the cutout portion 20 via the continuous portion 24A to the groove portion 22A of the inner surface 14Aa of the main flange portion 14A, the inner wall surface 24Aa ranging from the bottom surface 20a of the cutout portion 20 via the continuous portion 24A to the side surface 22Ac of the groove portion 22A, and the inner wall surface 24Ba ranging via the continuous portion 24B to the groove portion 22B are smoothly curved with the curvature radius R2 equal to or larger than the minimum bending radius of the optical fiber. Therefore, the optical fiber is prevented from being bent with a bending radius smaller than the minimum bending radius.

Additionally, even when the optical fiber F is guided from the groove portion 22A to the outer peripheral surface 12a of the main winding drum 12, the end portion of the groove portion 22A on the outer peripheral surface 12a side of the main winding drum is smoothly curved with the curvature radius R3 equal to or larger than the minimum bending radius of the optical fiber. Therefore, the optical fiber is prevented from being bent with a bending radius smaller than the minimum bending radius even in that place.

Moreover, as shown by the chain lines SA and SB of FIG. 5, the larger space S0 than the external diameter of the optical fiber to be wound needs to be secured between the extension line SA of the tangential line of the curved surface of inner wall surface 24Aa of the continuous portion 24A and the extension line SB of the tangential line of the curved surface of the inner wall surface 24Ba of the continuous portion 24B. Accordingly, as viewed from the radial outer side of the main flange portion 14A, excessive bending is prevented from occurring with the optical fiber within the cutout portion 22.

As described above, in the bobbin of the present embodiment, the optical fiber is also prevented from being bent with a radius smaller than the minimum bending radius thereof in any places. Therefore, the properties of the optical fiber can be excellently maintained.

Meanwhile, the groove width and the depth of the portion which opens from the groove portion 22B of the outer surface 14Ab of the main flange portion 14A via the continuous portion 24B to the inside of the cutout portion 20 is enlarged in a trumpet shape toward the cutout portion 20 from the groove portion 22B. Therefore, the optical fiber F can be smoothly introduced into the cutout portion 20 from the groove portion 22B.

Additionally, the groove width and the depth of the portion which is continuous with the groove portion 22A of the inner surface 14Aa of the main flange portion 14A via the continuous portion 24A from the cutout portion 20 is also enlarged in a trumpet shape toward the cutout portion 20 from the groove portion 22A. Therefore, the optical fiber F can be smoothly introduced into the groove portion 22A from the cutout portion 20.

For example, in the step shown in FIG. 11A, the optical fiber F may swerve from the groove portion 22B and the optical fiber F may not be easily guided into the cutout portion 20 such that the traveling path of the optical fiber F is linear with respect to the groove portion 22B. However, in the present embodiment, as the groove width is enlarged in a trumpet shape toward the cutout portion 20, the continuous portion 24B can reliably guide the optical fiber F into the cutout portion 20 even in such a case.

Figure 17:
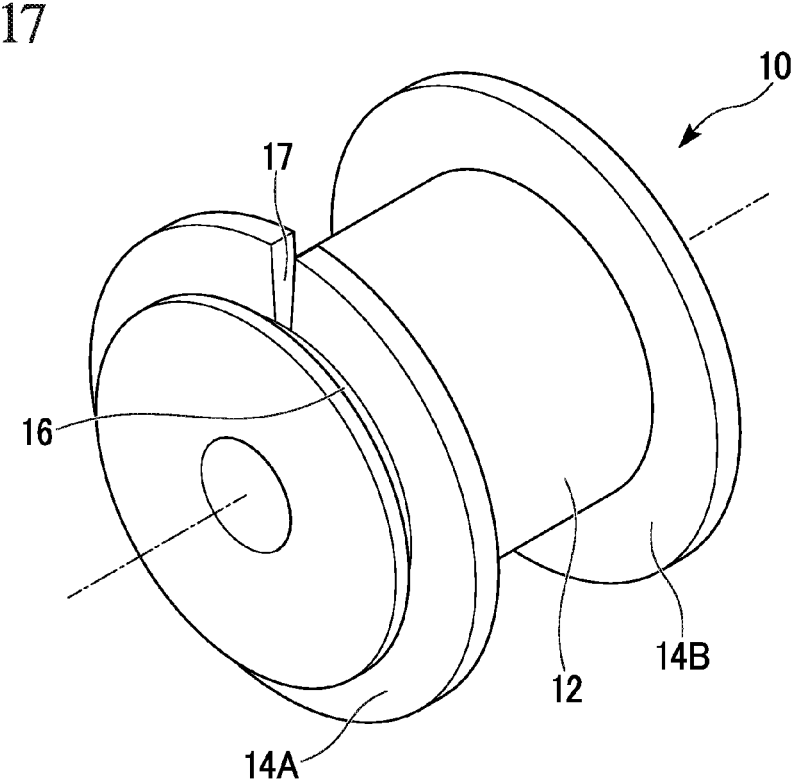
FIG. 17 is a schematic perspective view showing a second example of the related-art bobbin for winding an optical fiber.

Additionally, in the bobbin 10 of the present embodiment, as already described, the cutting depth (the depth toward the rotation center axis of the bobbin 10) DP of the cutout portion 20 is a depth that does not reach the outer peripheral surface 12a of the main winding drum 12. Therefore, as compared to a case where the slit 17 as shown in FIG. 17 is formed as in the related-art bobbin, deterioration of strength or rigidity of the main flange portion 14A caused by the formation of the cutout portion 20 is reduced. Particularly, the deterioration of the strength or rigidity of the main flange portion 14A can be further prevented by making the maximum depth DP of the cutout portion 20 as shallow as possible within a range such that the curvature radius R1 of the convex curve of the bottom surface 20a of the cutout portion 20 becomes larger than the minimum bending diameter of the optical fiber.

Moreover, the distance of the cutout portion 20 ranging from the bottom surface of the cutout portion in the maximum depth place to the outer peripheral surface 12a of the main winding drum 12 is determined to be larger than the winding thickness of the maximum winding diameter in a state where the optical fiber is wound around the main winding drum 12. Accordingly, the cutout portion 20 is always exposed to the outside of the optical fiber winding layer even in the state of the maximum winding diameter. Therefore, the introduction circumstances (whether or not the optical fiber is correctly introduced) of the optical fiber from the cutout portion 20 to the groove portion 22B can be easily checked.

Figure 14:
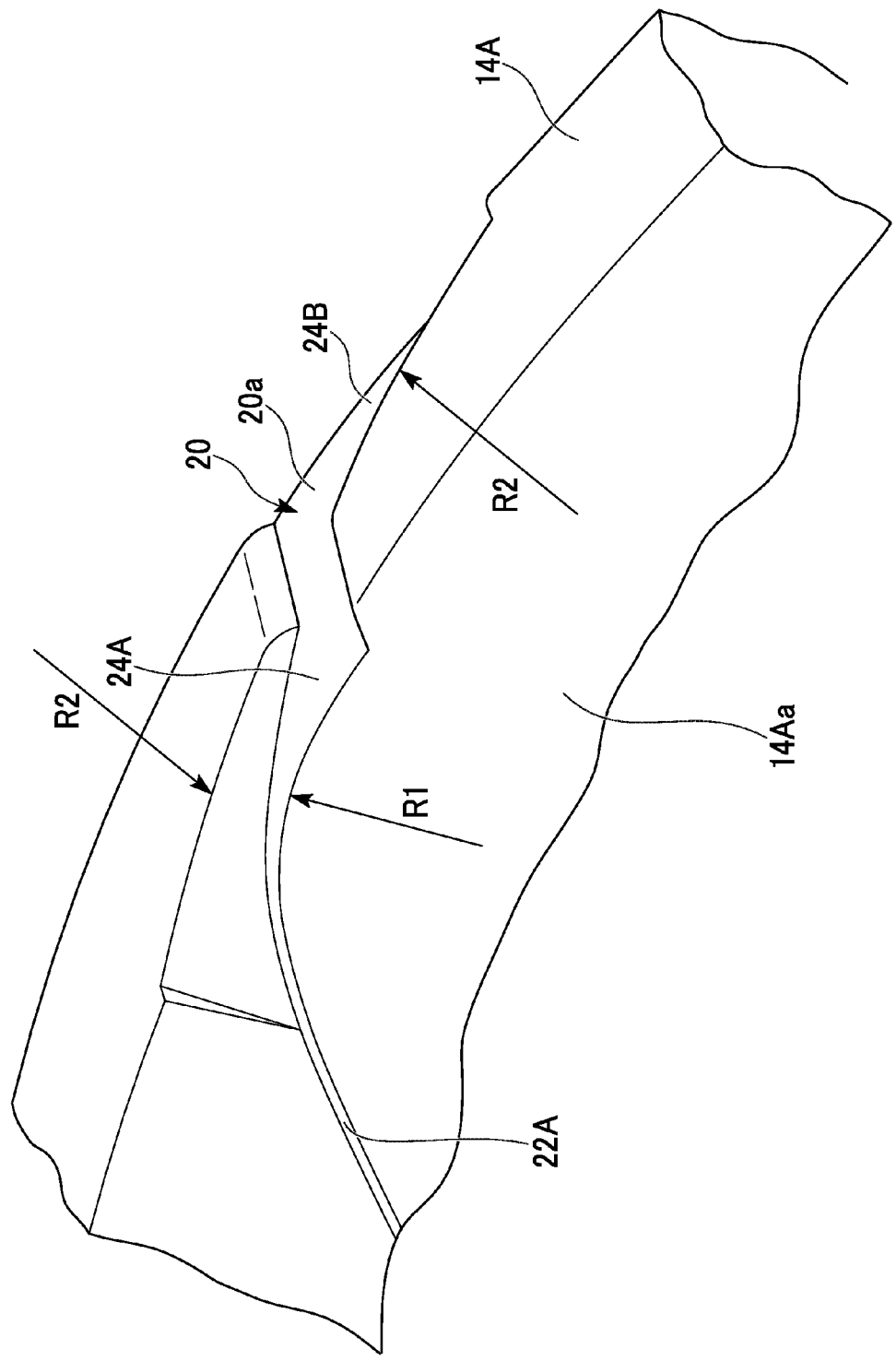
FIG. 14 is a schematic perspective view showing main portions of a bobbin for winding an optical fiber of another embodiment of the present invention.
Figure 15:
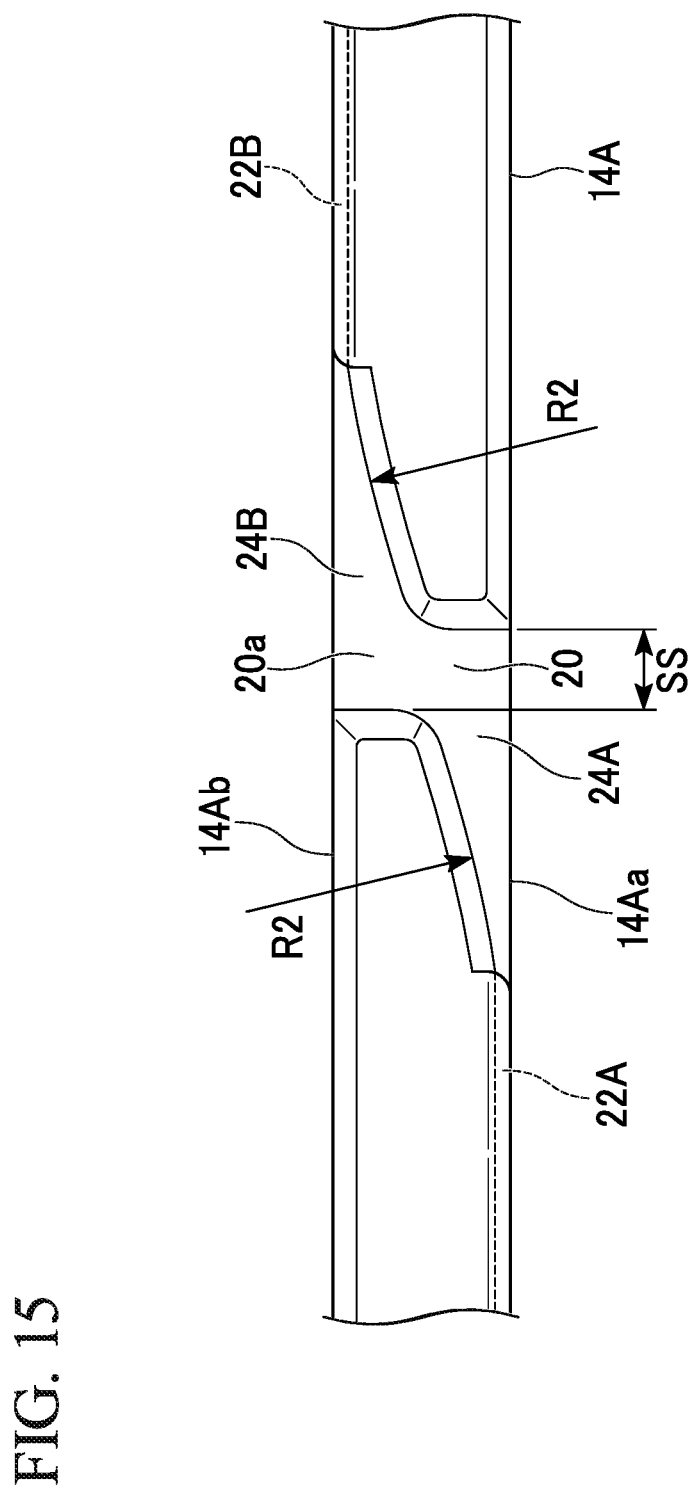
FIG. 15 is a front view showing main portions of the bobbin shown in FIG. 14.
Figure 16:
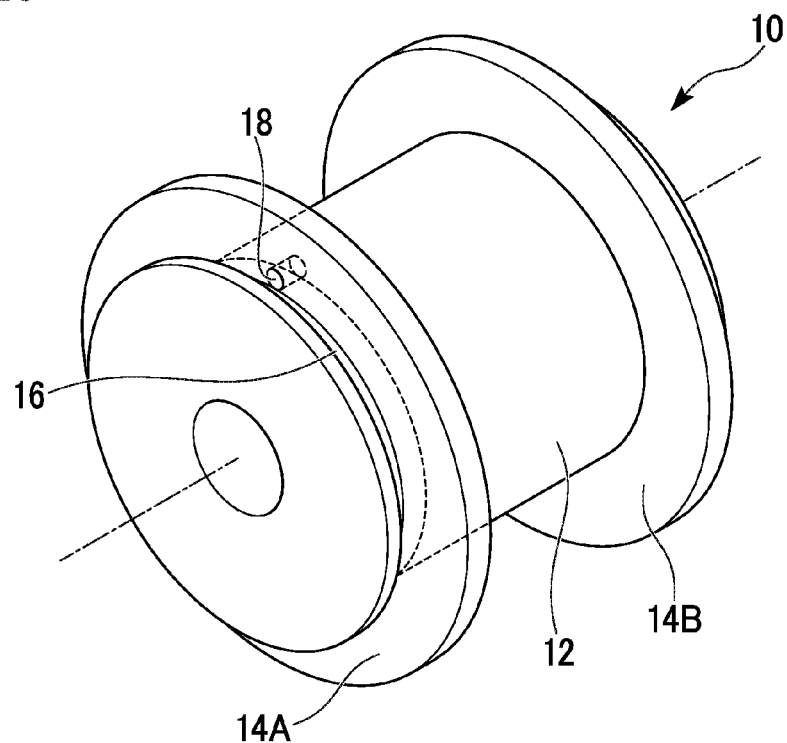
FIG. 16 is a schematic perspective view showing a first example of a related-art bobbin for winding an optical fiber.

Main portions (near the cutout portion 20 of the main flange portion 14A) of another embodiment of the bobbin 10 for winding an optical fiber of the present invention are shown in FIGS. 14 and 15.

Even in the other embodiment, the basic shape and the configuration are the same as those of the embodiment shown in FIGS. 1 to 8. However, the width (the length along the outer circumferential direction of the main flange portion 14A) SS of the cutout portion 20 is markedly smaller than that in the case of the embodiment shown in FIGS. 1 to 8. By making the width SS of the cutout portion 20 small in this way, it is possible to more reliably and easily guide the optical fiber from the groove portion 22B of the outer surface 14b of the main flange portion 14 via the cutout portion 20 to the inside of the groove portion 22A of the inner surface 14a of the main flange portion 14.

While the preferred embodiments of the present invention have been described and shown above, it should be understood that these are exemplary of the present invention and are not to be considered as limiting. Additions, omissions, substitutions, and other modifications of components can be made without departing from the concept of the present invention.

For example, a configuration in which the cutout portion 20, the groove portions 22A and 22B, the auxiliary winding drum 16A, the auxiliary flange portion 18A, and the like are provided only in one main flange portion 14A has been described in the above preferable embodiments. However, a configurations in which these components are provided in both of the main flange portions 14A and 14B may be adopted.

What is claimed is:

1. A bobbin for winding an optical fiber, comprising:
   a main winding drum comprising a cylindrical shape;
   an auxiliary flange portion that is provided on at least one of a first end and a second end of the main winding drum in an axis direction of the main winding drum;
   a first main flange portion that has a larger diameter than an external diameter of the auxiliary flange portion and that is provided on the main winding drum to face the auxiliary flange portion;
   a second main flange portion that is provided on the main winding drum to face the first main flange portion; and
   an auxiliary winding drum that is provided between the first main flange portion and the auxiliary flange portion,
   wherein a cutout portion that is recessed in a direction orthogonal to a central axis of the bobbin is formed at an outer peripheral edge of at least one of the first main flange portion and the second main flange portion,
   wherein a maximum depth from the outer peripheral edge of the cutout portion is a depth that does not reach an outer peripheral surface of the main winding drum, and
   wherein a groove portion, which communicates with the cutout portion and extends obliquely from the cutout portion along a tangential direction of the outer peripheral surface of the main winding drum toward the outer peripheral surface of the main winding drum, is formed in at least an inner surface and an outer surface of at least one of the first main flange portion and the second main flange portion.

2. The bobbin for winding an optical fiber according to claim 1,
   wherein a bottom surface in the cutout portion, as viewed from a section orthogonal to the central axis of the bobbin, is a curved surface that is convexly curved in a radial direction of at least one of the first main flange portion and the second main flange portion and a direction away from a center, and
   wherein the groove portion opens to an end portion of the cutout portion.

3. The bobbin for winding an optical fiber according to claim 2,
   wherein the curvature radius of the curve of the bottom surface of the cutout portion in the section orthogonal to the central axis of the bobbin is equal to or larger than the minimum bending radius of an optical fiber wound around the bobbin.

4. The bobbin for winding an optical fiber according to claim 3,
   wherein a portion between the end portion of the cutout portion and the groove portion is formed so as to be smoothly and continuously curved.

5. The bobbin for winding an optical fiber according to claim 4,
   wherein the curvature radius of the portion that is continuous with the end portion of the cutout portion from the groove portion is equal to or larger than the minimum bending radius of an optical fiber wound around the bobbin.

6. The bobbin for winding an optical fiber according to claim 2,
   wherein the curvature radius of the curve of the bottom surface of the cutout portion in the section orthogonal to the central axis of the bobbin is equal to or smaller than the curvature radius of a circumference of a circle, a central axis of which is a central axial line of the bobbin and which passes through the center of the bottom surface.

7. The bobbin for winding an optical fiber according to claim 6,
   wherein a portion between the end portion of the cutout portion and the groove portion is formed so as to be smoothly and continuously curved.

8. The bobbin for winding an optical fiber according to claim 7,
   wherein the curvature radius of the portion that is continuous with the end portion of the cutout portion from the groove portion is equal to or larger than the minimum bending radius of an optical fiber wound around the bobbin.

9. The bobbin for winding an optical fiber according to claim 2,
   wherein a portion between the end portion of the cutout portion and the groove portion is formed so as to be smoothly and continuously curved.

10. The bobbin for winding an optical fiber according to claim 9,
    wherein the curvature radius of the portion that is continuous with the end portion of the cutout portion from the groove portion is equal to or larger than the minimum bending radius of an optical fiber wound around the bobbin.

11. The bobbin for winding an optical fiber according to claim 2,
    wherein the portion that is continuous with the end portion of the cutout portion from the groove portion is formed so that a groove width is enlarged in a trumpet shape toward the end portion of the cutout portion from the groove portion.

12. The bobbin for winding an optical fiber according to claim 2,
    wherein a depth of the cutout portion is determined so that the bottom surface of the cutout portion is located closer to an outer periphery than the maximum winding diameter position of the optical fiber to be wound around the main winding drum.

13. The bobbin for winding an optical fiber according to claim 2,
   wherein the groove portions are respectively formed in both surfaces of the inner surface and the outer surface of at least one of the first main flange portion and the second main flange portion, and
   wherein the groove portion on the outer surface side of at least one of the first main flange portion and the second main flange portion is formed so as to extend obliquely from the cutout portion along a tangential direction of an outer peripheral surface of the auxiliary winding drum toward the outer peripheral surface of the auxiliary winding drum.

14. The bobbin for winding an optical fiber according to claim 1,
   wherein a depth of the cutout portion is determined so that the bottom surface of the cutout portion is located closer to an outer periphery than the maximum winding diameter position of the optical fiber to be wound around the main winding drum.

15. The bobbin for winding an optical fiber according to claim 1,
   wherein the groove portions are respectively formed in both surfaces of the inner surface and the outer surface of at least one of the first main flange portion and the second main flange portion, and
   wherein the groove portion on the outer surface side of at least one of the first main flange portion and the second main flange portion is formed so as to extend obliquely from the cutout portion along a tangential direction of an outer peripheral surface of the auxiliary winding drum toward the outer peripheral surface of the auxiliary winding drum.

16. An optical fiber wound around the bobbin for winding an optical fiber according to claim 1,
   wherein the optical fiber is guided to the outer peripheral surface of the main winding drum via the groove portion, the cutout portion, the auxiliary winding drum, and the main winding drum, and is wound around the outer peripheral surface without including a crossover wire.

17. An optical fiber wound around the bobbin for winding an optical fiber according to claim 2,
   wherein the optical fiber is guided to the outer peripheral surface of the main winding drum via the groove portion, the cutout portion, the auxiliary winding drum, and the main winding drum, and is wound around the outer peripheral surface without including a crossover wire.

* * * * *